Sept. 24, 1940.  C. E. CRAWFORD  2,216,000
AUTOMATIC PIPE LINE DELIVERY VALVE
Filed Jan. 16, 1939  2 Sheets-Sheet 1
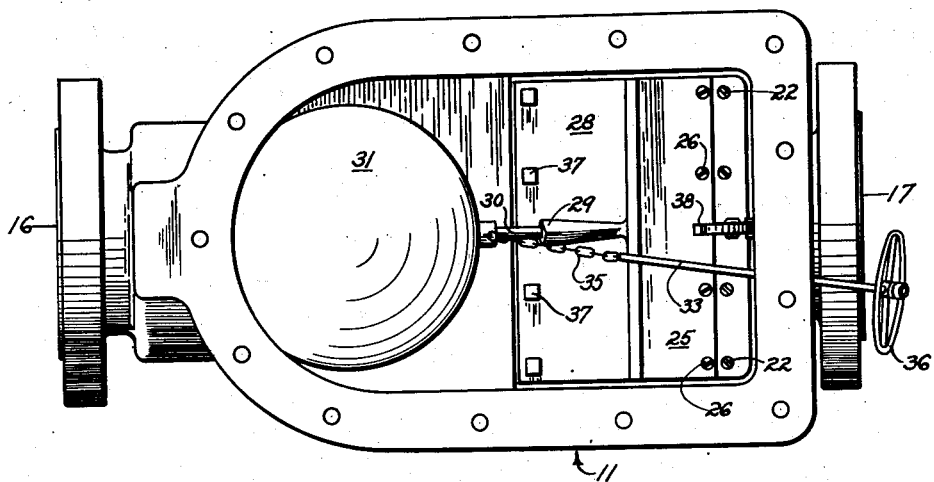
CARLOS E. CRAWFORD
INVENTOR.
BY *Hubert Miller*
ATTORNEYS.

Sept. 24, 1940.　　　C. E. CRAWFORD　　　2,216,000
AUTOMATIC PIPE LINE DELIVERY VALVE
Filed Jan. 16, 1939　　　2 Sheets-Sheet 2

CARLOS E. CRAWFORD
INVENTOR.

BY *Hubert Miller*
ATTORNEYS.

Patented Sept. 24, 1940

2,216,000

UNITED STATES PATENT OFFICE 2,216,000

AUTOMATIC PIPE LINE DELIVERY VALVE

Carlos E. Crawford, Tulsa, Okla.

Application January 16, 1939, Serial No. 251,138

6 Claims. (Cl. 137—68)

This invention relates to float valves, and more particularly to that type known in the oil industry as pipe line shut-off valves.

In flowing oil from reserve storage tanks into pipe lines for transfer to desired points a partial vacuum is usually maintained on the pipe line side of the shut-off valve to aid the gravity flow of the oil into and through the pipe line. This naturally tends to cause the oil to flow out of the valve casing faster than it flows into the casing, especially since the cross sectional area of the pipe line is usually greater than the cross sectional area of the ground line connecting the tanks to the valve. This vacuum plus the larger outlet capacity tends to practically empty or "starve" the valve casing of float valves of ordinary construction, due to the fact that they are not provided with means for regulating the size of the orifice through which oil flows out of the casing with relation to the volume of oil flowing into the casing. As a result, when the oil level in the valve casing gets low, the valve head is forced onto its seat and is held there by the partial vacuum even after liquid again begins to fill the casing. It then becomes necessary for an attendant to unseat the valve head because the float does not have sufficient buoyancy to do so. This necessitates constant watching on the part of an attendant.

The chief object of my invention, therefore, is to obviate this difficulty by providing a valve construction which includes a novel float operated valve head which automatically adjusts the size of the orifice through which liquid passes out of the casing to accommodate the volume of liquid flowing into the casing; which will automatically open when liquid begins to enter the valve casing, regardless of the partial vacuum on the outlet line; and which will automatically close the instant the liquid flow into the casing ceases, thus preventing any air or gas from entering the outlet line.

Other objects of the invention are: to provide a valve which maintains a liquid seal when in a closed position due to the fact that there is no friction to prevent the valve head from fully and completely seating; to provide a valve which can be used equally well with a large or small inlet line and a large or small outlet line; which includes an automatic bleeder valve for dispelling air or gas which enters the main valve casing either from the inlet or outlet lines, and which at the same time prevents air from passing from the main valve casing into either of these lines, regardless of vacuum and pressure variations; which embodies a back-up check valve which prevents oil from flowing from a battery of tanks on a comparatively high level into a battery of tanks on a lower level; the use of which eliminates the necessity of purchasing and using a separate bleeder valve and a separate back-up check valve for each battery of tanks; which can be used for simultaneously controlling the flow of oil from several different batteries of tanks on different levels; which embodies a safety pressure relief valve which eliminates danger from excessive pressure building up within the casing in case the bleeder valve becomes inoperative; which serves as a means of automatically permitting air or gas pressures in the outlet line to escape to the atmosphere; and which is so constructed that all of its working parts are readily accessible for removal, repair, or replacement.

Another object of the invention is to provide a valve which will handle "sour" or sulphur crude oils over long periods of time without its efficiency being impaired by the corrosion ordinarily attendant in the handling of such oils.

The details in a preferred form of my invention, together with other objects attending its production, will be better understood from the following detailed description when read in connection with the accompanying drawings, which are chosen for illustrative purposes only, and in which Figure 1 is a top plan view of a preferred form of my invention with the upper portion of the casing or housing removed;

Figure 2 is a vertical section taken through an assembled valve made according to the invention;

Like characters of reference designate like parts in all the figures.

Figure 3:
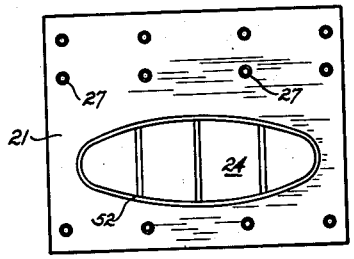
Figure 3 is a top plan view of a removable seat containing the liquid outlet port or orifice.

Referring to Figure 2, the illustrated embodiment of my invention includes a float chamber 10 formed inside a flanged lower casing portion 11 and a flanged top casing portion or cover 12, the flanges of which are secured together by any suitable means, such as by bolts 13 and screws 14. A gasket 15 is preferably positioned between the two casing sections, as shown. The lower part of the chamber is provided with an inlet passage 16 and an outlet passage 17, the latter being on a lower level than the inlet. The inlet passage is normally closed by a back-up check or clapper valve 18, the construction of which is usual and will be understood by those familiar with the art. Preferably this check valve 18 is assembled as a unit, the seat being secured over the inner end of the inlet passage by means of screws 19, for quick removal and replacement.

Figure 5:
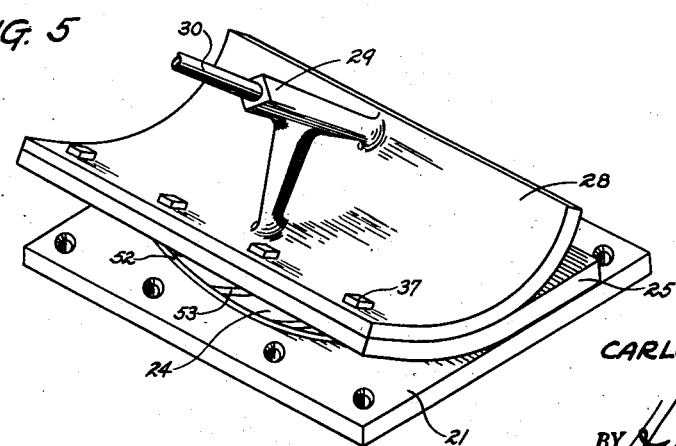
Figure 5 is a perspective view of the seat shown in Figure 3, together with a flexible valve head and a preferred means for seating and unseating the head on its seat.

Near the inner end of the outlet passage, the floor of the lower casing section 11 is recessed, as at 20, this recess being of a size to receive a valve seat 21 (see also Figs. 3 and 5), which is held in said recess by means of counter sunk screws 22. The recessed portion of the casing floor is provided with a port 23 which opens into the outlet passage 17. When the seat 21 is in position in the recess 20 its upper surface lies substantially in the same plane as the surface of the remaining portion of the floor of the chamber, and its oval shaped port 24 is located over the port 23.

As a valve head 25 I prefer to use a sheet of flexible material, such as rubber or a suitable composition, one edge of which is firmly secured to the seat 21 by means of screws 26 (Fig. 2) screwed into screw holes 27 (Fig. 3). The opposite edge of the head 25 is firmly secured by screws 37 or other suitable means along one edge of a concavo-convex valve head operating shoe or rocker 28 (Figs. 2 and 5) which is substantially in the form of a segment cut from the wall of a hollow cylinder, and which is centrally provided with a hub 29. A short rod 30 is rigidly connected to the hub 29 and to the float 31, as shown, and the float as it rises with the oil level in the chamber, rolls the rocker 28 across the surface of the flexible valve head 25, lifting that head from its seated position over the port 24.

A resilient bumper 32 is suitably secured in position on the floor of the chamber to serve as a rest for the float 31 to prevent possible injury thereto. I also provide a float operating rod 33 which slidably extends through the end wall of the casing section 11 through a suitable packing gland 34. The inner end of this rod 33 is connected to the float 31 by means of a chain 35, and the outer end is fitted with any suitable operating handle 36. This means of opening the valve is not a necessary part of my invention since the float will open the valve automatically, but the rod does serve as a convenience in case it is desired to learn the exact location of the float at any time. In an emergency it may also be used to open the valve in case the float loses its buoyancy for any reason. Figure 1 clearly shows that this rod 35 and its chain are located outside the path of travel of the hub 29 and the rod 30, and that the movement of the float 31 or of the rocker 28 is not in any way hampered by either the rod or chain. A plate spring 38 is suitably mounted on the chamber wall in alignment with the path of travel of the float 31, and serves to limit the movement of said float and to prevent possible injury thereto.

From Figures 1 and 2 it will be seen that the casing section 12 may easily be removed from section 11 without in any way affecting the operating parts thus far described. It will also be noted that the removal of this cover section 12 gives free access to the interior of the valve for removal or replacement of parts.

Figure 4:
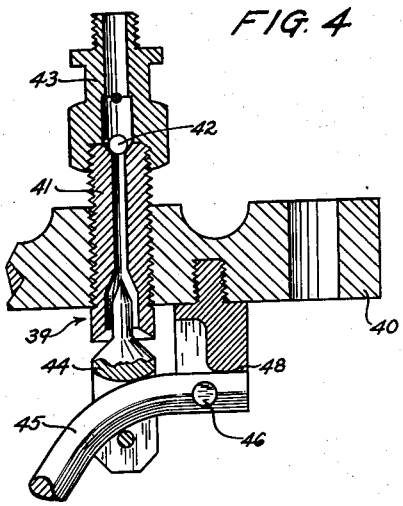
Figure 4 is a fragmentary sectional view showing the details of construction of a preferred form of the bleeder valve previously mentioned.

As a means of ridding the interior of the chamber 10 of gas or air I provide a combination bleeder and check valve which is designated as a whole by the numeral 39, and a preferred form of which is shown in Figure 4. This valve 39 is preferably mounted in the wall of a cover plate 40 which is secured over an aperture in the upper wall of the casing section 12. In case it is desired to dispense with the valve 39, a plain cover plate (not shown) is simply substituted.

The valve 39 (Fig. 4) comprises a body 41 having a valve seat in each of its ends. A ball check valve 42 is housed as shown within a suitable adapter 43, and permits air to pass outward from the chamber 10 but not into said chamber. As will be seen the other valve head 44 is bifurcated at its lower end and straddles an operating rod 45, one end of which is pivoted at 46, and the other end of which is rigidly attached to the float 47 (Fig. 2). When the liquid level in the chamber 10 rises sufficiently, the float 47 is raised and the valve 44 is seated, preventing the air remaining in the chamber from escaping and consequently building up a pressure in the upper portion of the chamber which will prevent the liquid from completely filling said chamber. When the liquid level in the chamber drops, the float moves downward, unseating the valve head 44. The movement of this head 44 away from its seat is limited by the rod 45, the extreme end of which contacts the shoulder 48 (Fig. 4) the contact preventing further pivotal movement of the arm 45.

As an added safety against excessive pressures building up inside the chamber 10 when oil is not flowing through the casing (in case the valve 39 becomes inoperative or clogged), I provide a small pop-off or pressure relief valve 49 of ordinary construction, mounted on a pipe 50, which pipe is in direct communication with a port 51 (Fig. 2) which serves as a by-pass between the interior of the chamber and the outlet passage 17. This valve 49 is constructed to open when the pressure within the chamber approaches an undesirable point due to expansion from heat, etc. The valve will not open from the suction on the flow line to which the outlet is connected, nor will it permit air to pass from the outlet passage into the interior of the chamber 10.

As will also be seen from Figs. 1 and 2 the outer ends of both the inlet and outlet passages 16 and 17 may be provided respectively with suitable perforated annular flanges for facilitating the connection of the valve in a line. If preferred other connecting means, such as a threaded male or female collar, may be provided.

Again referring to the seat 21, I call attention to the fact that a raised ridge 52 surrounds the port 24, and this ridge buries in the nether surface of the flexible and resilient valve head 25 when the head is seated, thus making a positive seal between the head and its seat. A plurality of cross bars 53 are rigidly secured across the port 24, as shown, and serve to limit the sagging of the flexible head into said port.

*Operation*

As liquid is turned into the pipe line which is connected to the inlet 16, whether it be under pressure or under gravity flow, the clapper valve 18 opens and liquid begins to fill the chamber 10. By the time the level in the chamber reaches a certain level (determined by the buoyancy of the float 31) the float 31 begins to move in an arcuate path toward the bumper 38 moving the rocker 28 and lifting one edge of the flexible head 25, thus partially opening the port 24. When this port 24 has opened to an extent that the volume of liquid flowing out through the port 24 is equal to the volume flowing into the casing through the inlet 16, the float ceases its movement and the level of liquid in the chamber remains substantially constant. During the time the oil is rising in the chamber the valve 39 is open and the air in the chamber is free to pass to the outside of the chamber, thus preventing the building up of pressure inside the casing. In the case of gravity flow of liquid into the casing from one or more storage tanks, the volume of flow decreases as the liquid level in the tanks gets low. When the flow into the casing decreases, the liquid level drops and simultaneously the float moves toward its original position, at the same time reducing the open flow area through the port 24, thus maintaining a smooth flow of liquid into the outlet line. When flow into the casing stops, the float rests on the bumper 32 and the port 24 is completely closed leaving approximately an inch of liquid in the bottom of the chamber to form a liquid seal around the valve head 25 and its seat 21.

With such a construction it will be seen that this control or shut-off valve requires no machined surfaces. The valve head 25 will seal against its seat 21 regardless of any corrosion of the seat due to the handling of sour crude. It will also be seen that the valve head 25 seats and opens almost entirely without friction, so that there is no possibility of the valve remaining partly open or "cracked" when the flow of liquid stops; the possibility of air entering the outlet line is thus eliminated. A valve constructed according to this invention will work perfectly connected to a small inlet pipe line and a large outlet line, or vice versa; and will also work equally well when there is pressure on the inlet line, partial vacuum on the outlet line, or both, and regardless of pressure or vacuum variations, and also when the flow is entirely by gravity through both lines.

Obviously I do not limit myself to the described and illustrated embodiment of the invention, but consider as within the scope of my invention any apparatus that falls within the scope of the claims which are ultimately allowed.

I claim:

1. An automatic liquid control apparatus for pipe lines comprising a float chamber having an inlet passage and an outlet passage, and a valve for controlling the flow of liquid into said outlet passage including: a substantially flat seat having a through port therein; a sheet of flexible material having one of its edges firmly secured flat against said seat adjacent said port, and adapted to serve as a valve head for covering and uncovering said port; float operated means for progressively rolling up the free edge of said sheet away from said seat as the liquid level in said chamber rises; a check valve for preventing the flow of liquid from said chamber outward through said inlet passage while affording free flow of liquid into said chamber through said inlet passage; and a float operated valve near the top of said chamber normally affording free passage for air or gas from the chamber to the atmosphere and adapted to close in response to the rise of the liquid level in said chamber to a point near the upper end thereof.

2. An automatic liquid control apparatus for pipe lines comprising a float chamber having an inlet passage and an outlet passage, and a valve for controlling the flow of liquid into said outlet passage including: a substantially flat seat having a through port therein; a sheet of flexible material having one of its edges firmly secured flat against said seat adjacent said port, and adapted to serve as a valve head for covering and uncovering said port; float operated means for progressively rolling up the free edge of said sheet away from said seat as the liquid level in said chamber rises; a by-pass around said valve connecting the chamber and said outlet passage; and a normally closed valve controlling said by-pass adapted to open when the pressure within said chamber reaches a predetermined amount.

3. An automatic liquid control apparatus for pipe lines comprising a float chamber having an inlet passage and an outlet passage, and a valve for controlling the flow of liquid into said outlet passage including: a substantially flat seat having a through port therein; a sheet of flexible material having one of its edges firmly secured flat against said seat adjacent said port, and adapted to serve as a valve head for covering and uncovering said port; float operated means for progressively rolling up the free edge of said sheet away from said seat as the liquid level in said chamber rises; a by-pass around said valve connecting the chamber and said outlet passage; and a normally closed valve controlling said by-pass adapted to open when the pressure within said chamber reaches a predetermined amount; and a check valve for preventing the flow of liquid from said chamber outward through said inlet passage while affording free flow of liquid into said chamber through said inlet passage.

4. An automatic liquid control apparatus for pipe lines comprising a float chamber having an inlet passage and an outlet passage, and a valve for controlling the flow of liquid into said outlet passage including: a substantially flat seat having a through port therein; a sheet of flexible material having one of its edges firmly secured flat against said seat adjacent said port, and adapted to serve as a valve head for covering and uncovering said port; float operated means for progressively rolling up the free edge of said sheet away from said seat as the liquid level in said chamber rises; a by-pass around said valve connecting the chamber and said outlet passage; and a normally closed valve controlling said by-pass adapted to open when the pressure within said chamber reaches a predetermined amount; and a float operated valve near the top of said chamber normally affording free passage for air or gas from the chamber to the atmosphere and adapted to close in response to the rise of the liquid level in said chamber to a point near the upper end thereof.

5. An automatic liquid control apparatus for pipe lines comprising a float chamber having an inlet passage and an outlet passage, and a valve for controlling the flow of liquid into said outlet passage including: a substantially flat seat having a through port therein; a sheet of flexible material having one of its edges firmly secured flat against said seat adjacent said port, and adapted to serve as a valve head for covering and uncovering said port; float operated means for progressively rolling up the free edge of said sheet away from said seat as the liquid level in said chamber rises; a by-pass around said valve connecting the chamber and said outlet passage; and a normally closed valve controlling said by-pass adapted to open when the pressure within said chamber reaches a predetermined amount; a check valve for preventing the flow of liquid from said chamber outward through said inlet passage while affording free flow of liquid into said chamber through said inlet passage; and a float operated valve near the top of said chamber normally affording free passage for air or gas from the chamber to the atmosphere and adapted to close in response to the rise of the liquid level in said chamber to a point near the upper end thereof.

6. A valve for automatically controlling the delivery of liquid into a main pipe line comprising: a chamber having an inlet passage and an outlet passage; a ported valve seat through which liquid must pass to reach the outlet passage; a valve head made of a sheet of flexible material mounted on said valve seat for covering and uncovering the port therein; a rocker, in the form of a segment of a hollow cylinder, attached to one edge of said valve head and adapted to roll up the attached edge thereof as the rocker is rolled over the surface of the head, thus uncovering or opening the port in said seat; an operating lever rigidly attached to and extending outward from said rocker; and a float operatively connected to the outer end of said operating lever for rocking said rocker back and forth across the surface of said valve head as the liquid level in the chamber rises and falls.

CARLOS E. CRAWFORD.